(12) United States Patent
Matthias et al.

(10) Patent No.: US 11,917,469 B2
(45) Date of Patent: Feb. 27, 2024

(54) APPARATUS FOR THE CONFIGURATION OF A WIRELESS RADIO CONNECTION AND METHOD OF CONFIGURING A WIRELESS RADIO CONNECTION

(71) Applicant: Sennheiser electronic GmbH & Co. KG, Wedemark (DE)

(72) Inventors: Steffen Matthias, Hamburg (DE); Norbert Werner, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 43 days.

(21) Appl. No.: 17/117,365

(22) Filed: Dec. 10, 2020

(65) Prior Publication Data

US 2021/0176680 A1    Jun. 10, 2021

(30) Foreign Application Priority Data

Dec. 10, 2019 (DE) .......................... 102019133684.8

(51) Int. Cl.
*H04W 36/36* (2009.01)
*G10L 25/60* (2013.01)
(Continued)

(52) U.S. Cl.
CPC ......... *H04W 36/0088* (2013.01); *G10L 25/60* (2013.01); *H04W 36/0016* (2013.01); *H04W 36/30* (2013.01); *H04W 36/36* (2013.01)

(58) Field of Classification Search
CPC .... G10L 25/60; G10L 25/78; H04W 36/0016; H04W 36/0088; H04W 36/30; H04W 36/36; H04W 84/12
See application file for complete search history.

(56) References Cited

U.S. PATENT DOCUMENTS 6,031,915 A * 2/2000 Okano ................... G10L 15/26
                                                      704/E15.045
6,707,821 B1 * 3/2004 Shaffer ............... H04L 47/2416
                                                      370/347
(Continued)

FOREIGN PATENT DOCUMENTS

WO        WO9809454        3/1998

OTHER PUBLICATIONS

German Search Report for Application No. DE 10 2019 133 664.8 dated Oct. 29, 2020.
(Continued)

*Primary Examiner* — Jay P Patel
(74) *Attorney, Agent, or Firm* — Eugene LeDonne; Haug Partners LLP

(57) ABSTRACT

In radio networks having a plurality of access points, for example WiFi, a wireless audio end device like for example a microphone or headphones is connected to an access point, to which it sends its audio data or from which it receives same. Audio transmission should occur as far as possible in interruption-free manner and with low latency. If the audio end device is moved the connection quality in relation to the previous access point can decrease and require scanning or roaming. In that respect first another base station is sought and then the radio connection is redirected there. In order in that case to avoid disruptive signal interruptions portions of the audio signal which can be particularly well predicted are detected or predicted by means of short-term statistical methods, like for example speech pauses. Scanning and roaming are then carried out during the predicted portions, whereby interruptions which are perceptible to a user are avoided.

9 Claims, 3 Drawing Sheets

(51) Int. Cl.
*H04W 36/00* (2009.01)
*H04W 36/30* (2009.01)

(56) References Cited

U.S. PATENT DOCUMENTS

| | | | |
|---|---|---|---|
| 10,014,006 B1* | 7/2018 | Smith | H04M 3/493 |
| 10,560,787 B2* | 2/2020 | Bhat | H03F 1/3258 |
| 11,711,656 B2* | 7/2023 | Bhat | H03F 3/2175 |
| | | | 381/317 |
| 2004/0249634 A1* | 12/2004 | Degani | G10L 17/26 |
| | | | 704/207 |
| 2006/0053007 A1 | 3/2006 | Niemisto | |
| 2006/0287856 A1* | 12/2006 | He | G10L 15/063 |
| | | | 704/256 |
| 2008/0267224 A1 | 10/2008 | Kapoor et al. | |
| 2008/0287065 A1* | 11/2008 | Eklund | H04H 20/62 |
| | | | 455/42 |
| 2009/0111389 A1* | 4/2009 | Grushkevich | H04B 1/034 |
| | | | 455/77 |
| 2009/0111519 A1* | 4/2009 | Grushkevich | H04B 1/034 |
| | | | 455/150.1 |
| 2009/0316872 A1* | 12/2009 | Wolf | H04M 3/567 |
| | | | 379/202.01 |
| 2010/0017208 A1* | 1/2010 | Maruyama | G10L 25/78 |
| | | | 704/E15.001 |
| 2010/0254477 A1* | 10/2010 | Uchida | H01P 1/182 |
| | | | 375/295 |
| 2011/0124288 A1* | 5/2011 | Chen | H04H 20/22 |
| | | | 455/42 |
| 2011/0311001 A1 | 12/2011 | Lindenbauer et al. | |
| 2014/0270196 A1* | 9/2014 | Braho | G10L 21/047 |
| | | | 381/56 |
| 2014/0361831 A1* | 12/2014 | Hoffmeister | H03F 3/2171 |
| | | | 330/251 |
| 2016/0111111 A1* | 4/2016 | Levitt | G10L 21/013 |
| | | | 704/226 |
| 2017/0149512 A1* | 5/2017 | Einzinger | H04W 52/08 |
| 2018/0124524 A1* | 5/2018 | Bhat | H03F 3/2175 |
| 2019/0041842 A1* | 2/2019 | Cella | G06V 10/7784 |
| 2019/0369616 A1* | 12/2019 | Ostafew | B60W 60/00274 |
| 2019/0369626 A1* | 12/2019 | Lui | G05D 1/0221 |
| 2020/0013407 A1* | 1/2020 | Chae | G06F 3/167 |
| 2021/0035442 A1* | 2/2021 | Baig | G08G 1/0112 |
| 2021/0144526 A1* | 5/2021 | Zilberman | H04B 5/0031 |
| 2021/0337321 A1* | 10/2021 | Bhat | H03F 1/3258 |

OTHER PUBLICATIONS

German Examination Report for Application No. DE 10 2019 133 684.8 dated Mar. 14, 2022.

* cited by examiner

APPARATUS FOR THE CONFIGURATION OF A WIRELESS RADIO CONNECTION AND METHOD OF CONFIGURING A WIRELESS RADIO CONNECTION

CROSS REFERENCE TO RELATED APPLICATION(S)

This application claims the benefit of the foreign priority of German Patent Application No. 10 2019 133 684.8, filed on Dec. 10, 2019, the entirety of which is incorporated herein by reference.

FIELD OF DISCLOSURE

The invention concerns an apparatus for the configuration of a wireless radio connection and a method of configuring a wireless radio connection.

BACKGROUND

In radio networks having a plurality of access points, for example WiFi or 5G a wireless audio end device like for example a microphone or a headphone is connected to an access point (AP), to which it sends its audio data or from which it receives same. The audio transmission should be effected as far as possible interruption-free and with low latency (that is to say in real time) in order for example at the microphone to avoid strongly perceptible echo effects or at the headphone to avoid a loss in synchronization in relation to a video signal. If the audio end device is moved it can happen that the connection quality to the previous access point decreases and a better connection can be achieved by a change in the access point (so-called roaming or handover). Depending on the respective technology involved that transition causes short interruptions in the connection, for example due to a change in the radio channel or due to scanning operations to establish the most appropriate access point. Depending on the respective radio technology those interruptions can be pronounced to differing degrees and can adversely affect the audio signal. For example in the case of WiFi radio networks that procedure causes a number of interruptions in the audio signal of in part over 50 ms duration, which can be acoustically perceptible to the user. A similar problem occurs in radio systems with only one access point in which however different radio channels are used if a change in the radio channel in operation is necessary.

In known radio systems brief interruptions due to scanning, roaming and handover processes are typically compensated by buffering of the data packets for 100 ms or more. For data packets which have been lost renewed transmission can also be required. At any event however that increases the latency of the audio signal because all packets are put into intermediate storage. In addition a data transmission with an at least briefly increased data rate is necessary, but that is not always available. For wireless audio systems however both interruptions are to be avoided and also latency is to be reduced or minimized. In that respect the aim is latencies of below 10 ms (from the recording transducer to the radio signal).

Known WLAN networks already support various methods of reducing the time duration of the interruption in data streams. For example the current AP can provide a list of adjacent APs and the channels used by them. Therefore not all possible channels have to be scanned, but it is sufficient to scan only the channels used by adjacent APs. In that way the number of required scanning processes is reduced. In addition authentication of the AP or the WLAN station can be transmitted in advance to the future AP in order to reduce the length of the interruption in the actual roaming process from several 100 ms to about 50 ms. That eliminates fresh negotiation of the encryption.

Due to scanning or roaming or configuration processes related thereto in the network however interruptions which are acoustically perceptible to the user in the audio signal of for example about 50 ms duration or more can nonetheless occur.

SUMMARY OF THE INVENTION

An object of the invention is to reduce perceptible interruptions caused by scanning, roaming/handover or by a channel change in the wirelessly transmitted audio signal without in that case increasing latency.

The object is attained by an apparatus as set forth in claim 1. Claims 12 and 13 concern methods according to the invention.

The invention is based on the realization that speech or singing normally always includes periods of time like for example pauses in which an interruption in transmission does not cause disruption or can be very well concealed and which are often long enough to carry out scanning, roaming/handover or other configuration processes in the radio connection. For example pauses are mostly longer than 50 ms and often even markedly longer than 100 ms. According to the invention, based on an analysis of the transmitted audio signal, a configuration process in the radio connection like for example the change in the access point or the channel change can be timed in such a way that the interruptions occur in such periods of time and are therefore not or scarcely perceptible in the audio signal. For that purpose in analysis of the audio signal time periods are detected or predicted, in which a transmission error or an interruption in transmission can be particularly well concealed. Many different methods of error concealment are known.

Further advantageous embodiments are described in claims 2-11 and 14-15.

BRIEF DESCRIPTION OF THE DRAWINGS

Further details and advantageous configurations are shown in the drawings in which.

DETAILED DESCRIPTION OF THE INVENTION

Figure 1:
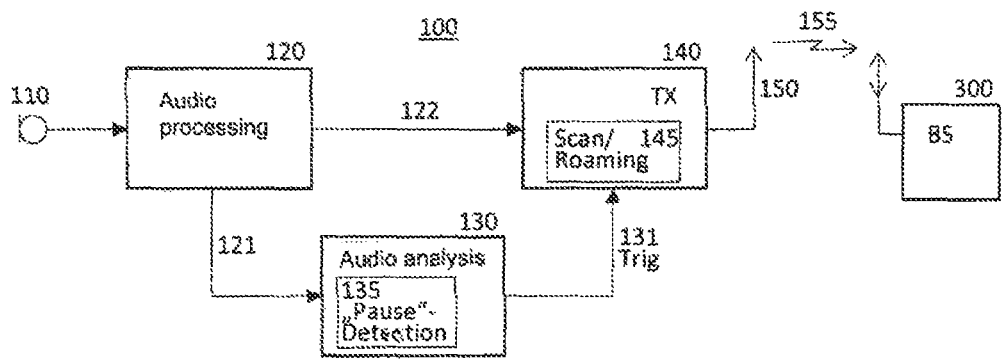
FIG. 1 shows a block diagram of an apparatus for the configuration of a wireless radio connection for audio transmission in a first embodiment.

FIG. 1 shows in a first embodiment of the invention a block diagram of an apparatus for the configuration of a unidirectional wireless radio connection for audio transmission. In this case the apparatus 100 can be part of a mobile audio device, like for example a wireless microphone. Configuration of the wireless radio connection can include switching over a radio channel or radio frequency in use to another radio channel or radio frequency. In this case the base station to which the mobile audio device is connected remains the same. In another example configuration of the wireless radio connection can include roaming, that is to say a change in the base station to which the mobile audio device has a radio connection. In this case however the radio frequency or the radio channel is often also changed. Configuration of the wireless radio connection can also include other processes which can lead to interruptions in the transmitted audio signal, for example calibration in high-frequency processing.

In this embodiment the apparatus 100 includes an audio input or sound transducer 110, an audio processing unit 120, an audio analyzer 130 and a transmitting unit 140. The audio processing unit 120 can include various amplifiers, optionally an analog-digital converter (ADC) and other usual functions. It generates a first audio signal 122 which is output to the transmitting unit 140 so that the latter generates a high-frequency signal modulated with the first audio signal. That is radiated by way of an antenna 150 which is connected to the transmitting unit 140 and sends the wireless audio signal 155 to a base station 300. In this case the wireless transmission can be effected for example in accordance with the WiFi (or IEEE 802.11) standard. It is however also possible for the wireless transmission to be effected using another method. Irrespective of the actual transmission it can often happen that the apparatus 100 can briefly not transmit during operation, for example while another transmitting frequency or another transmitting channel is being sought or selected or if the mobile device including the apparatus 100 is moved and in so doing is too far away from its base station.

According to the invention the audio signal 121 is analyzed by the audio analyzer 130 to detect or predict a time period at which configuration of the wireless network (possibly after error concealment) causes as few disturbances as possible in the audio signal at the receiver. In that case analysis over a period of some seconds may be adequate, for example 5-120 seconds. By way of example a signal pause detector 135 can detect pauses in the audio signal. Such a detected time period is identified by a control or trigger signal 131 which the audio analyzer 130 outputs to the transmitting unit 140. The control or trigger signal 131 indicates that an interruption in the audio signal at that time will cause only a slight or no audible disruption for the user. The transmitting unit thereupon controls configuration processes of the wireless network like scanning or roaming in such a way that they take place during the time period indicated by the control or trigger signal 131.

A particularity in this respect is that the apparatus operates in real time and the audio signal is therefore to pass the apparatus with minimum latency. For that reason there is as little buffering as possible between the audio input or sound transducer 110 and transmission by the transmitting unit 140. Therefore the apparatus produces a very low latency of for example at most 10 ms, preferably at most 2 ms, for the audio signal.

Speech signals and singing signals usually consist of segments, with loud and soft or silent segments alternating. In that respect the loud segments can correspond to syllables or parts of syllables while silent segments are pauses therebetween, including pauses between words. The silent segments can be used for example for breathing but there can also be pauses which are caused by occlusion of the vocal apparatus at given sounds. For example the word "happy" includes a pause during the sound "p" which can be about 100 ms long because the lips are closed. Pauses between words are often 200 ms in length or longer. Human speakers differ from each other however, inter alia due to individually different pause lengths.

Figure 2:
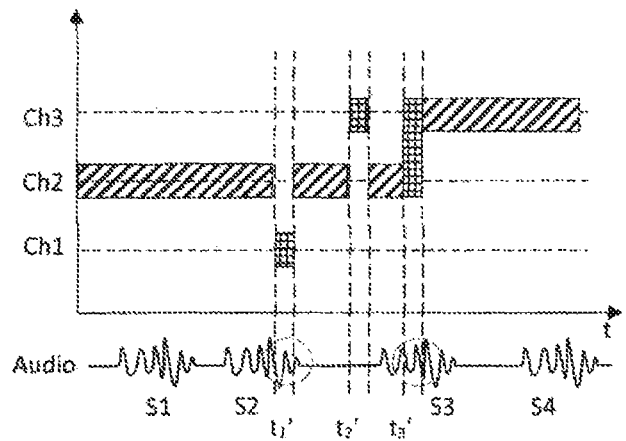
FIG. 2 shows a diagram illustrating a time sequence of configuration of a wireless radio connection according to the state of the art.

FIG. 2 firstly shows a diagram illustrating a time sequence of configuration of a wireless radio connection according to the state of the art. By way of example this can be a WLAN or WiFi radio connection. In that case a given radio channel Ch2 is used for transmission or reception. If the quality of the radio connection becomes worse or for some other reason a search or scan process begins at the time t1'. For active scanning the transmitter briefly interrupts transmission, switches to another channel Ch1 and transmits a query on the other channel Ch1 in order to establish whether the channel Ch1 is occupied or delivers a better signal quality. Alternatively the device can only receive even without transmitted query whether data are already being transmitted on the other channel Ch1 (passive scanning). Here however the reception duration should be greater, depending on a respective radio system, for example for WLAN networks 100 ms while active scanning only takes about 20-30 ms. If the channel Ch1 is not yet occupied by another radio connection the base station using that channel can send a corresponding response signal, from which then for example there entails an identification of the base station and the network as well as the signal quality. In that respect this can be the same base station to which there is the current radio connection, or another base station.

The scanning process can be repeated a number of times, for example at a time t2' on another channel Ch3. When finally a free channel which can be alternatively used has been found, for example with better signal quality than the current channel Ch2, the transmitter finally switches over its transmission frequency permanently to that channel at a time t3'. If in that case the base station is changed then the switching-over effect is identified as "roaming". In known devices configuration of the radio connection, that is to say for example scanning and roaming, is carried out completely independently of the audio signal or useful signal. Therefore the configuration periods can coincide with relevant audio contents S2, S3, in which case audio data are lost and popping or other interference noises can occur. That is indicated in FIG. 2 at the times t1' and t3'. The same problem can also occur in further network configuration processes, for example if the transmitting unit 140 carries out a calibration operation.

Figure 3:
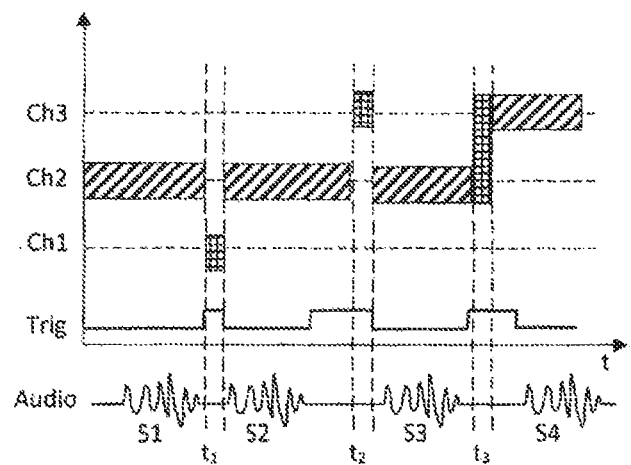
FIG. 3 shows a diagram illustrating a time sequence according to the invention of configuration of a wireless radio connection for audio transmission.

FIG. 3 shows a diagram illustrating the time sequence according to the invention in respect of configuration of a wireless radio connection for audio transmission. In this case the audio signal is analyzed and, in this example, silent segments are detected or predicted. A corresponding trigger or control signal 131 Trig, which is generated by the audio analyzer 130, indicates the silent segments to the transmitting unit 140. The transmitting unit 140 can use that signal to implement configuration of the radio connection, like for example scanning or roaming. For that purpose the transmitting unit 140 can have a suitable configuration unit like for example a scanning or roaming unit 145 which carries out configuration of the radio connection corresponding to the trigger/control signal 131. Thus configuration of the radio connection can now take place at times t1, t2, t3 which are in the pauses in the audio signal so that the audio signal does not suffer disruption. For analysis of the audio signal a duration of some seconds to minutes is sufficient to be able to predict silent segments.

In this example the trigger/control signal 131 indicates possible times at which a configuration process can take place because the audio signal has a pause or at least is of a very low amplitude. For that purpose for example the mean signal power of the audio signal can be calculated within a window of 10-20 ms. If the value is below a threshold value a pause is recognized. The audio analyzer can also determine an adaptive threshold value for that purpose. Alternatively the trigger/control signal 131 can also indicate times at which the audio signal is admittedly of a greater amplitude but—at least for a duration of at least 50 ms—particularly good error concealment can be carried out at the receiver end, for example in the case of uniform longer sounds. By way of example in singing, compared to speech, individual sounds are often relatively long and uniform so that an interruption can be easily hidden electronically (by error concealment) at the receiver. The audio analyzer 130 can detect or predict suitable appropriate times, as is described hereinafter.

Figure 4:
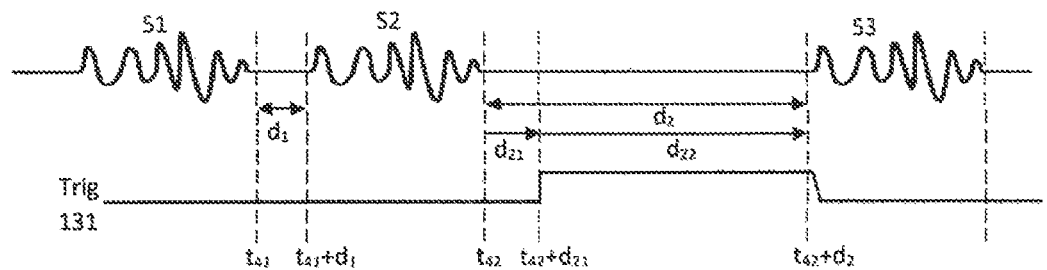
FIG. 4 shows a time sequence of switching over of a wireless radio connection for audio transmission.

FIG. 4 shows details of the time sequence of a process for switching over a wireless radio connection for audio transmission. As described above the audio signal includes loud segments S1, S2, S3 separated by silent segments or pauses. The loud segments are of differing lengths, for example in the region of 50 ms-200 ms. Likewise the pauses can be of different lengths. A first pause which at time t41 follows the first loud segment S1 is of a duration of d1. A second pause which follows at the time t42 the second loud segment S2 is of a duration of d2 before a third loud segment S3 begins. To minimize latency audio analysis is effected in real time so that assumptions have to be made about the pause length to be expected, at the beginning of the pause. The audio analyzer 130 can establish for example that the first pause of the length d1 is too short for configuration tasks. Therefore the control signal Trig 131 does not show any pause. In the second pause in contrast the audio analyzer 130 after a certain time d21 establishes that the pause is probably sufficiently long for configuration tasks for example because most pauses which occurred in the preceding five seconds (or most of those pauses which were at least of a given length d21) were at least 100 ms long. At that time therefore the control signal Trig 131 indicates a pause. The remaining useable pause here is of a length of d22, that is to say the total length of the pause d2 less the time d21 required for detection of the pause. In that case the time d21 required for detection of the pause can also be shorter or longer than the remaining useable pause d22 if the remaining useable pause d22 is sufficient for the respective configuration task. It will be noted that the actual length d22 of the remaining useable pause at that time t42+d21 is normally not yet known. In an embodiment a pause is indicated only when, on the basis of statistics, a remaining pause length d22 of at least N ms is to be expected (for example with N=50). The indicated pause can last until, at the time t42+d2, the beginning of the next loud segment S3 is detected. If the pause is used for configuration and at that time a configuration process is still running that can be broken off so that the speech signal S3 can be transmitted as far as possible without delay.

In an embodiment, during discontinuance of the configuration operation or up to the end thereof audio data can be stored temporarily (for example 1-3 speech segments or 20 ms to 100 ms) in a buffer memory and then read out again at a slightly increased speed or data rate so that the data are not lost and thus signal jumps are avoided. In that way error concealment at the receiver becomes easier. It will be noted that this functions in the mobile device only if the radio connection has sufficient band width to transmit the additional data. In a variant, in regard to the data read out at the increased data rate, the pauses contained in the speech signal can be shortened (time stretching) in order not to alter the pitch of the speech segments.

In an embodiment the audio analyzer 130 measures the length of the silent segments or pauses continuously, periodically or over a given period of time and applies corresponding statistics, at least from values of the seconds or minutes which have just elapsed. Taking those statistics but in addition also general empirical values or earlier measurements or other sources it is possible to define a minimum length d21 of a pause, for example 10 ms, in order to sufficiently reliably detect pauses. If a pause of the minimum length were detected in the audio signal the audio analyzer can indicate that by the trigger/control signal 131. The length of the pause to be expected is user- and situation-specific and can already be predicated after a short training phase on the basis of the statistics. For example it is possible to establish that the pauses which are at least X ms long on average last for at least Y ms (for example with X=20, Y=50 or X=100, Y=500). Alternatively or in addition the analyzer 130 can also measure the length of the loud segments S1, S2, S3 in order in that way to predict the beginning or the length of the next pause. For example it is possible to establish that the loud segments on average last no longer than X ms (for example with X=200) or that after loud segments of a certain length X ms there follows a pause of typically at least Y ms. With that information which can vary from speech to speech and individually from speaker to speaker it is possible for the pause to be more quickly recognized.

In another variant the audio analyzer 130 can investigate the length and uniformity of individual loud segments S1-S3 and detect particularly uniform and long loud segments. For example a particularly uniform loud segment can have a particularly high autocorrelation. That can be measured within a moving window of for example 10-20 ms in length. As described above that can also be used for configuration as in this case error concealment can be particularly effectively implemented at the receiver. In that way an interruption in the audio signal, caused by the configuration operation, can be concealed at that time at the receiver better than usual.

An advantage of the described statistical method is that it requires no speech recognition and no syntactical or semantic analysis. It is therefore independent of the speech actually being used. A further advantage is that the method can very quickly adapt to the respective user and/or the respective situation.

Figure 5:
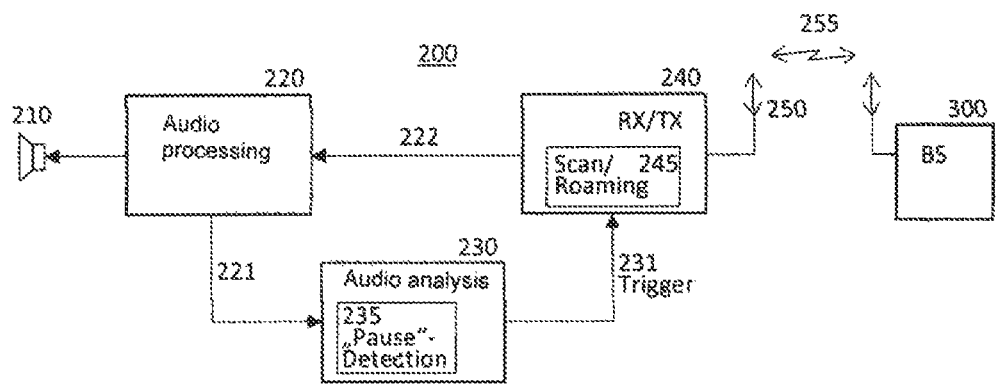
FIG. 5 shows a block diagram of an apparatus for the configuration of a wireless radio connection for audio transmission in a second embodiment.

FIG. 5 in an embodiment of the invention shows a block diagram of an apparatus for the configuration of a wireless radio connection for audio transmission. The apparatus 200 in this embodiment can include a mobile audio device like for example a body-pack receiver, an in-ear monitor or also a mobile telephone. In this embodiment the apparatus 200 includes a transmitting/receiving unit 240, an audio processing unit 220, an audio analyzer 230 and an audio output or sound transducer 210. Similarly to the audio processing unit 120 the audio processing unit 220 can have various amplifiers, optionally a digital-analog converter (DAC) and other usual functions. It receives an audio signal 222 from the transmitting/receiving unit 240 which it has obtained by demodulation of a modulated HF signal received from the base station 300. The audio analyzer 230 can include for example a pause detector 235.

In most cases configuration of the wireless radio connection like scanning and roaming is carried out by the base station 300. The transmitting/receiving unit 240 in the mobile device can however establish that the reception quality of the radio transmission 255 is decreasing, for example because the mobile device containing the apparatus 200 is being moved, and send a corresponding message to the base station 300. For that purpose an audio signal 221 is passed from the audio processing unit 220 to the audio analyzer 230 which carries out an analysis operation as described above and generates a control signal Trig 231. The message sent to the base station 300 can contain the control signal Trig 231 which indicates opportune times for reconfiguration of the radio connection 255.

In another embodiment configuration of the wireless radio connection or scanning and roaming can also be carried out by the mobile device, for example by a configuration unit 245 which can be a scanning/roaming unit and which can be disposed in the transmitting/receiving unit 240. That can be controlled directly by the control signal 231 generated by the audio analyzer 230, as correspondingly described hereinbefore with reference to FIG. 1.

Figure 6:
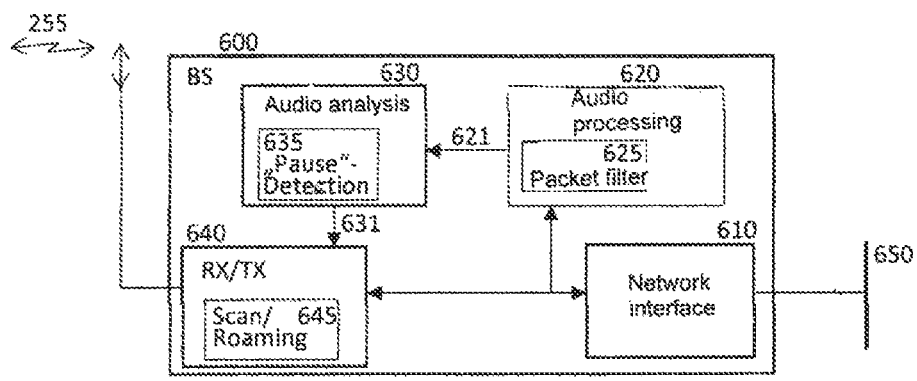
FIG. 6 shows a block diagram of an apparatus for the configuration of a wireless radio connection for audio transmission in a third embodiment.

In an embodiment the base station is adapted to carry out configuration of the wireless radio connection. FIG. 6 shows a base station 600 which can be connected to a network 650 by way of a network interface 610. The network can be a data network like for example an LAN network or a mobile radio network. The base station also includes a radio interface 640, for example in accordance with the WiFi/WLAN standard (IEE802.11) or a mobile radio standard, by way of which it is connected by way of the radio connection 255 to one or more mobile devices. The network interface 610 receives from the network 650 data packets which are intended for one or more of the mobile devices connected to the base station 600, and passes other data packets received from the mobile devices into the network 650. If configuration or reconfiguration of a given radio connection becomes necessary an audio processing unit 620 which can include a packet filter 625 extracts audio data packets of the correspond radio connection and processes the audio data contained therein, for example by partial or complete decoding. Those audio data packets can originate either from the corresponding mobile device which is connected by way of the radio connection 255 or from another subscriber connected by way of the network 650. The audio data 621 obtained in the audio processing unit 620 are passed to an audio analyzer 630. The audio analyzer 630 which in principle can correspond to the above-described audio analyzers 130, 230 and which for example can include a pause detection unit 635 analyzes the audio signal contained in the audio data 621 and sends to the radio interface 640 a trigger signal 631 which indicates a pause in that audio signal, as described above. In response to the trigger signal 631 the radio interface 640 can perform reconfiguration of the radio connection 255 or it can pass a signal to the respective mobile device so that same performs a reconfiguration of the radio connection 255. In that case the mobile device includes a configuration unit 145, 245 but does not need an audio analyzer 130, 230.

Figure 7:
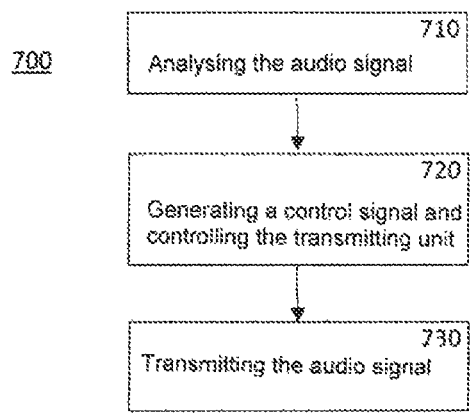
FIG. 7 shows a flow chart of a method according to the invention of configuring a wireless radio connection for audio transmission.

In an embodiment the invention concerns an automatically implemented method of configuring a transmitting unit for a wireless radio connection, as shown in FIG. 7. The method 700 includes analyzing 710 an audio input signal by an audio analyzer 130, wherein with a statistical method in real time at least one period, for example a pause, in the audio signal is detected and possibly the length thereof to be expected is predicted, and wherein a control signal 131 is generated, which indicates the predicted period. The method 700 further includes control 720 of a transmitting unit 140 by means of the control signal 131 and transmitting 730 the audio signal by the transmitting unit 140, wherein during the period indicated by the control signal 131 the transmitting unit effects configuration of the wireless radio connection.

In another embodiment the invention concerns an automatically implemented method of configuring a transmitting/receiving unit 240 for a wireless radio connection 255. The method includes receiving an audio signal by way of a wireless radio connection, analyzing the received audio signal by an audio analyzer 230, wherein with a statistical method in real time at least one period, for example a pause, in the audio signal is predicted and wherein a control signal 231 is generated, which indicates the predicated period. The method further includes control of the transmitting/receiving unit 240 by means of the control signal 231 and reconfiguration of the radio connection 255, wherein reconfiguration is effected during the period indicated by the control signal 231. Reconfiguration can be effected by the transmitting/receiving unit 240 or by the base station 300.

The invention can be implemented with a processor configurable by software. Configuration is effected by a computer-readable data carrier with instructions which are stored thereon and which are suitable for programming the processor in such a way that it executes the steps of the above-described method.

The invention can be used in various devices, for example for wireless microphones, body-pack transmitters, body-pack receivers, telephones, base stations or headphones.

The invention claimed is:

1. An apparatus for the configuration of a wireless radio connection comprising:
   at least one audio data input or sound transducer;
   an audio processing unit which receives an audio signal from the audio data input or sound transducer;
   an audio analyzer which analyzes the previous audio signal received from the audio data input or sound transducer, then predicts upcoming time periods in which a transmission error or a transmission gap can be well concealed and outputs a control signal which indicates the predicted upcoming time periods; and
   a transmitting unit which transmits an audio signal received from the audio processing unit to at least one receiving device and switches over between various transmitting frequencies or between various receiving devices;
   wherein the transmitting unit receives the control signal of the audio analyzer and wherein switching over of the transmitting unit between various transmitting frequencies or various receiving devices is controlled in dependence on the control signal such that it is effected during the predicted upcoming time periods of the audio signal;
   wherein the predicted upcoming time periods are upcoming pauses;
   wherein the audio signal has a latency of at most 10 ms from the audio input or sound transducer to transmission by the transmitting unit;
   wherein the upcoming pauses are longer than 50 ms,
   wherein the audio analyzer statistically evaluates the previous audio signal to predict the length of the upcoming pauses, wherein the control signal indicates the pauses only when they are of an expected remaining minimum length.

2. The apparatus as set forth in claim 1, wherein the audio analyzer statistically evaluates the position or length of previous loud segments in the previous audio signal to predict the length of the upcoming pauses.

3. The apparatus as set forth in claim 1, wherein the audio analyzer statistically evaluates the position or length of previous pause segments in the previous audio signal in order to predict the length of the upcoming pauses.

4. The apparatus as set forth in claim 1, wherein a radio connection in accordance with the IEEE802.11 standard is used between the transmitting unit and the receiving device.

5. The apparatus as set forth in claim 1, wherein the transmitting unit performs a scanning operation on the various transmitting frequencies and at the end of the pause a scanning operation which has not been concluded is discontinued.

6. The apparatus as set forth in claim 1, wherein at the end of the pause one or more speech segments are stored in a buffer memory and then are read out of the buffer memory again at increased speed.

7. A method of configuring a transmitting unit for a wireless radio connection, comprising the steps:
analyzing an audio input signal in an audio analyzer, wherein with a statistical method at least one period of time is predicted in the audio signal, in which the audio signal can be well predicted, and wherein a control signal is generated, which indicates the at least one predicted period of time;
controlling a transmitting unit by the control signal; and
transmitting the audio signal by the transmitting unit, wherein the transmitting unit carries out configuration of the wireless radio connection during the at least one predicted period of time indicated by the control signal;
wherein the at least one predicted period of time is an upcoming pause;
wherein the audio signal has a latency of at most 10 ms from the audio input or sound transducer to transmission by the transmitting unit;
wherein the pause is longer than 50 ms,
wherein the audio analyzer statistically evaluates the previous audio signal to predict the length of the upcoming pauses,
wherein the control signal indicates the pauses only when they are of an expected remaining minimum length.

8. A method of configuring a transmitting and receiving unit for a wireless radio connection comprising the steps:
receiving an audio signal by way of a wireless radio connection;
analyzing the received audio signal in an audio analyzer, wherein with a statistical method at least one period of time is predicted in the audio signal, in which the audio signal can be well predicted, and wherein a control signal is generated, which indicates the at least one predicted period of time;
controlling the transmitting and receiving unit by the control signal; and
reconfiguration of the wireless radio connection, wherein reconfiguration is effected during the at least one predicted period of time indicated by the control signal;
wherein the at least one predicted period of time is a pause;
wherein the audio signal has a latency of at most 10 ms from the audio input or sound transducer to transmission by the transmitting unit;
wherein the pause is longer than 50 ms,
wherein the audio analyzer statistically evaluates the previous audio signal to predict the length of the upcoming pauses,
wherein the control signal indicates the pauses only when they are of an expected remaining minimum length.

9. The method as set forth in claim 7, wherein configuration or reconfiguration of the wireless radio connection includes calibration of a high-frequency unit.

\* \* \* \* \*